United States Patent
Boone

(10) Patent No.: US 10,129,499 B1
(45) Date of Patent: Nov. 13, 2018

(54) SECURING WIRELESS NETWORK CREDENTIALS WITHOUT A USER LOGIN

(71) Applicant: GoPro, Inc., San Mateo, CA (US)

(72) Inventor: David A. Boone, Belmont, CA (US)

(73) Assignee: GOPRO, INC., San Mateo, CA (US)

( * ) Notice: Subject to any disclaimer, the term of this patent is extended or adjusted under 35 U.S.C. 154(b) by 0 days.

(21) Appl. No.: 15/371,144

(22) Filed: Dec. 6, 2016

Related U.S. Application Data

(60) Provisional application No. 62/264,035, filed on Dec. 7, 2015.

(51) Int. Cl.
  *H04N 5/907* (2006.01)
  *H04W 12/06* (2009.01)
  *H04L 9/06* (2006.01)
  *H04W 12/04* (2009.01)
  *H04L 9/08* (2006.01)

(52) U.S. Cl.
  CPC ........... *H04N 5/907* (2013.01); *H04L 9/0643* (2013.01); *H04L 9/0863* (2013.01); *H04L 9/0866* (2013.01); *H04W 12/04* (2013.01); *H04W 12/06* (2013.01); *H04L 2209/80* (2013.01)

(58) Field of Classification Search
  CPC .................................................... H04W 12/06
  See application file for complete search history.

(56) References Cited

U.S. PATENT DOCUMENTS

| | | | |
|---|---|---|---|
| 2007/0118479 A1 | 5/2007 | Halsema | |
| 2010/0299417 A1* | 11/2010 | Austin | H04N 7/163 709/221 |
| 2012/0266217 A1 | 10/2012 | Kaal | |
| 2013/0021949 A1 | 1/2013 | Kaal | |
| 2014/0033288 A1 | 1/2014 | Wynn | |
| 2014/0337633 A1 | 11/2014 | Yang | |
| 2015/0195710 A1 | 7/2015 | Bar-Niv | |
| 2015/0332060 A1* | 11/2015 | Tsumura | H04W 4/008 726/26 |

* cited by examiner

*Primary Examiner* — Christopher K Peterson
(74) *Attorney, Agent, or Firm* — Gazdzinski & Associates, PC

(57) ABSTRACT

Disclosed is a system and method for securely storing a Wi-Fi password or similar WLAN security credentials on a device, such as a camera. The password is secured by encryption using an encryption key generated from the Service Set Identifier (SSID) of the network. A one-way-hash of the SSID is stored in a non-volatile memory of the device, but the plaintext SSID is not stored on the device. At a later time, the device may detect the SSID of the network and hash the detected SSID. If the hash matches a previously stored hash, an encryption key is generated from the SSID and the encryption key is used to decrypt the password associated with the matching hash. Without knowledge of the SSID, an attacker who gains access to the device will not be able to recover the password from the hashed SSID and the encrypted password.

20 Claims, 5 Drawing Sheets

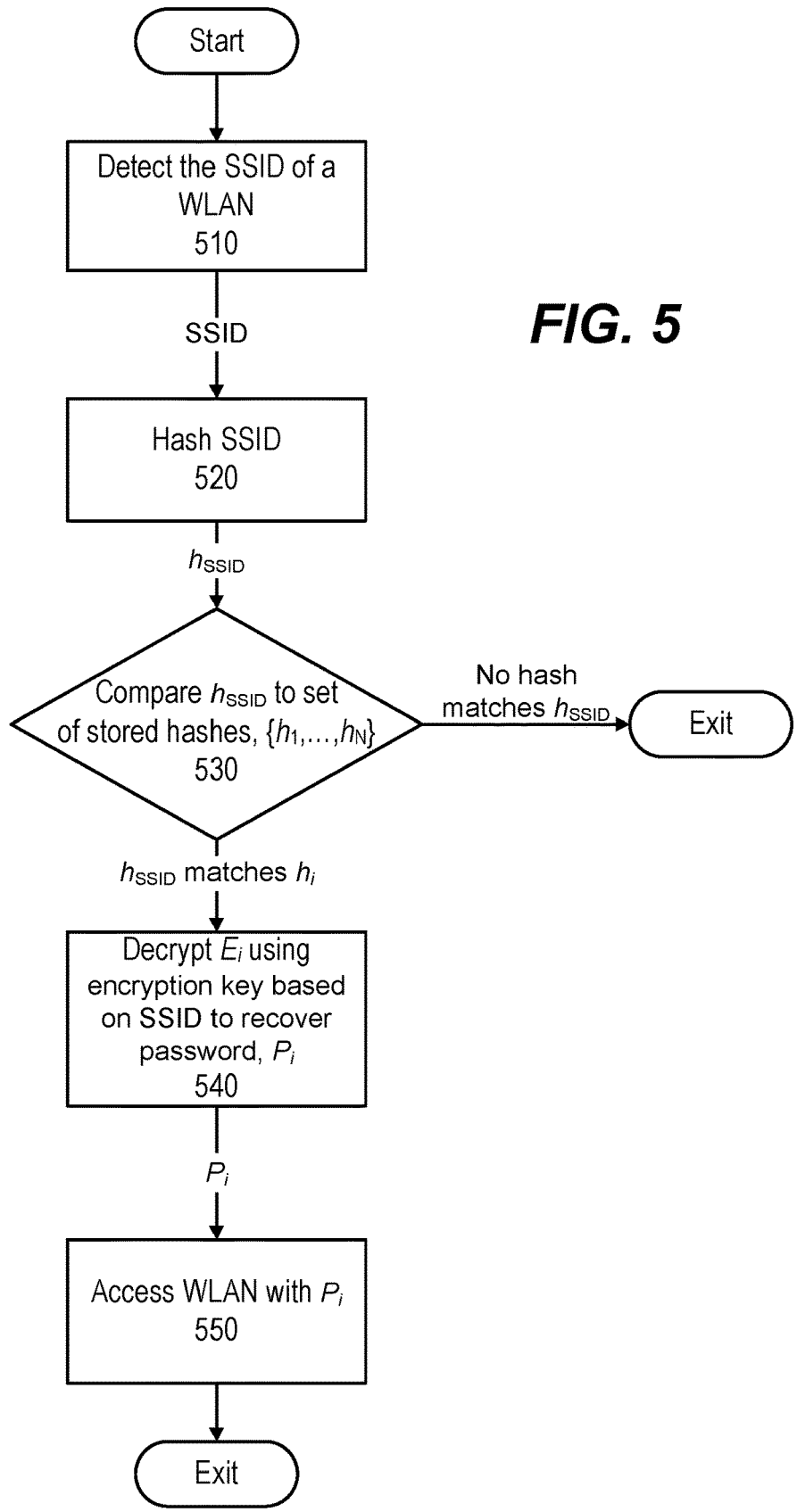

SECURING WIRELESS NETWORK CREDENTIALS WITHOUT A USER LOGIN

RELATED APPLICATIONS

This application claims the benefit of U.S. Provisional Patent Application No. 62/264,035 filed on Dec. 7, 2015, the content of which is incorporated by reference in its entirety herein.

TECHNICAL FIELD

The disclosure generally relates to the field of secure data storage and in particular to securely storing the security key for a Wireless Local Area Network (WLAN).

BACKGROUND

A WLAN is a communication link between two or more devices which facilitates information transfer. Wi-Fi (i.e., the IEEE 802.11 standards) is a particularly ubiquitous type of WLAN. A Wi-Fi network is often used to provide access to a larger network, such as an intranet or the Internet. Wi-Fi networks are identified by a Service Set Identifier (SSID), which is commonly known as a "network name." To prevent malicious users from connecting to a Wi-Fi network or intercepting transmissions sent over the network, a Wi-Fi network may be secured. A variety of security protocols exist for securing a Wi-Fi network, such as Wireless Equivalent Privacy (WEP), Wi-Fi Protected Access (WPA), and WPA2. Access may be provided to a secured Wi-Fi network through a security key, colloquially known as a Wi-Fi password.

For numerous reasons, it may be advantageous to store the password for a Wi-Fi network on a device. Storing a Wi-Fi password may allow a device to connect to the network without requiring the user to input a password every time the user wants to connect to the network. For devices which do not have an interface convenient for a user to input a password, such as some cameras, storing the Wi-Fi password is particularly advantageous. Devices may also be configured to automatically connect to a Wi-Fi network when the network is available.

Although storing a Wi-Fi password on a device is convenient for the end user, if proper security measures are not taken, a stored password may present a significant security vulnerability. If a malicious actor gains access to a device with a stored Wi-Fi password, the password may be stolen, giving the malicious actor access to the Wi-Fi network. After acquiring the password, the malicious actor could potentially intercept or alter sensitive information sent over the Wi-Fi network. In addition, users frequently reuse passwords across different systems (e.g., websites) or use passwords which are substantially similar to each other. Accordingly, it might be substantially easier for a malicious actor who acquires a Wi-Fi password to gain access to other secure systems. Thus, Wi-Fi passwords are generally stored in some obfuscated form.

Conventionally, a Wi-Fi password is encrypted using an encryption key based on a second password which is entered by a user. This password may be, for example, a password used to unlock a device. However, a device which is not itself secured by a password cannot rely on this technique to secure a stored Wi-Fi password. Some devices, such as cameras, do not require a password to unlock the device because requiring a password inconveniences a user or because the device lacks a means for a user to input a password.

Hence, there is a need to securely store a password for a WLAN on device without requiring user authentication.

SUMMARY

In one aspect of the present disclosure, a method for encrypting and storing a wireless network password on a camera with a wireless network interface is disclosed. In one embodiment thereof, the method includes: receiving an SSID (Service Set Identifier) for a wireless network; receiving the wireless network password for the wireless network identified by the SSID; hashing the SSID with a one-way hashing function to generate a hashed SSID; storing the hashed SSID in a non-volatile memory of the camera; generating an encryption key from the SSID; encrypting the wireless network password with the encryption key to generate an encrypted password; and storing the encrypted password in the memory of the camera, wherein the encrypted password is associated with the hashed SSID in the memory.

In another aspect of the present disclosure, a non-transitory computer readable medium is disclosed. In one embodiment thereof, the non-transitory computer readable medium stores instructions for encrypting and storing a wireless network password on a camera with a wireless network interface, the instructions when executed by one or more processors causing the one or more processors to: receive an SSID (Service Set Identifier) for a wireless network; receive the wireless network password for the wireless network identified by the SSID; hash the SSID with a one-way hashing function to generate a hashed SSID; store the hashed SSID in a non-volatile memory of the camera; generate an encryption key from the SSID; encrypt the wireless network password with the encryption key to generate an encrypted password; and store the encrypted password in the memory of the camera, wherein the encrypted password is associated with the hashed SSID in the memory.

In another aspect of the present disclosure, a camera is disclosed. In one embodiment, the camera includes: a wireless network interface; a non-transitory computer readable medium storing computer executable instructions; and one or more hardware processors to execute the computer executable instructions to: receive an SSID (Service Set Identifier) for a wireless network; receive a wireless network password for the wireless network identified by the SSID; hash the SSID with a one-way hashing function to generate a hashed SSID; store the hashed SSID in a non-volatile memory of the camera; generate an encryption key from the SSID; encrypt the wireless network password with the encryption key to generate an encrypted password; and store the encrypted password in the memory of the camera, wherein the encrypted password is associated with the hashed SSID in the memory.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates a block diagram of an example system environment of a camera accessing wireless networks.

FIG. 5 illustrates a block diagram of a process for decrypting a password for a WLAN based on the WLAN's SSID.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system and method for securely storing a Wi-Fi password or similar WLAN security credentials on a device, such as a camera. The password may be secured by encryption using an encryption key that is based on the Service Set Identifier (SSID) of the network. A one-way-hash of the SSID is computed and stored in a non-volatile memory of the device, but the plaintext SSID is not stored on the device. At a later time, the device may detect the SSID of the network and hash the detected SSID. If the hash matches a previously stored hash, an encryption key may be generated from the SSID and the encryption key can be used to decrypt the password associated with the matching hash. Without knowledge of the SSID, an attacker who gains access to the device will generally not be able to recover the password from the hashed SSID and the encrypted password.

Throughout this disclosure, securing wireless credentials will be discussed with particular reference to securing the credentials used with Wi-Fi protocols. However, it will be apparent to one skilled in the art that the wireless credentials of a different wireless protocol can be secured in alternate embodiments. Similarly, in some embodiments, wireless credentials corresponding to multiple types of WLANs may be securely stored in the device. For example, Bluetooth credentials may be securely stored by hashing a device's Bluetooth address and encrypting the link key with an encryption key based in the Bluetooth address.

Example System Configuration

Figure 1:
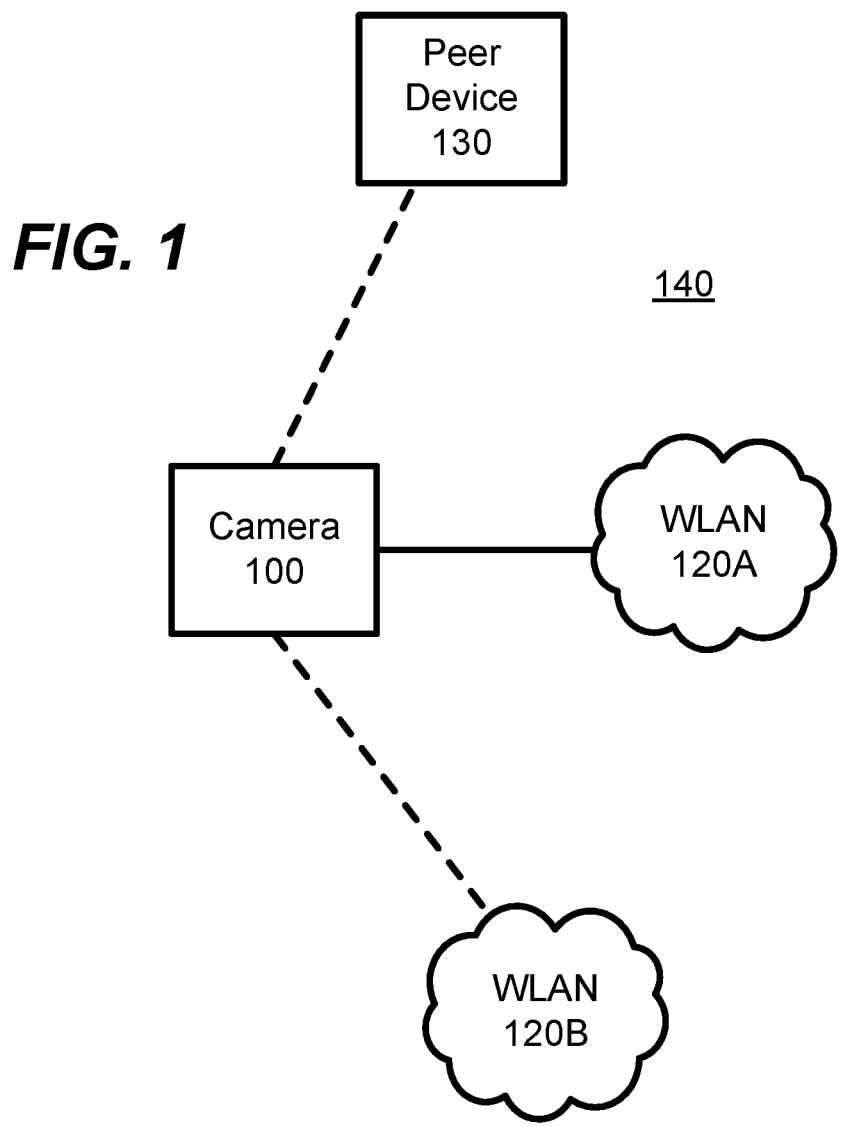

FIG. 1 is a system diagram illustrating an example system environment 140. The system environment 140 includes a camera 100, a peer device 130, and two WLAN networks 120A, 120B. In alternative configurations, different and/or additional components may be included in the system environment 140.

The camera 100 may be a digital camera which includes a Wireless Network Interface Controller (WNIC) which allows the camera 100 to communicatively couple to a wireless network (e.g., WLAN 120A or 120B). The camera 100 may be capable of connecting to one WLAN at a time or multiple WLANs simultaneously. The camera 100 may include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. The camera 100 may capture images and videos at various frame rates, resolutions, and compression rates.

The two WLANs 120A, 120B are wireless local area networks, which may be, for example, Wi-Fi networks. The WLANs 120A, 120B may provide connected devices with access to a larger network, such as the Internet or an intranet. A WLAN may also provide for peer-to-peer information transfer between two or more connected devices. A WLAN may connect to multiple devices, such as the camera 100. Each WLAN may include an identifier, specific to that WLAN, such as a service set identifier (SSID).

An Access Points (AP) is a hardware device that allows devices such as the camera 100 to connect to a particular WLAN. An AP may connect to a router (e.g., an Internet or intranet router) or be part of a router. Each AP may be associated with one WLAN, but multiple APs may allow devices to connect to the same WLAN. For example, two APs may allow devices to connect to the first WLAN 110A, and another AP may allow devices to connect to the second WLAN 110B. A Wi-Fi WLAN (e.g., 120A, 120B) where network access is provided by APs is known as an "infrastructure mode" network.

The peer device 130 is a device capable of wireless communication over a network that is not an AP. The peer device 130 may be, for example, a remote control, a camera, a smartphone, a laptop, a desktop computer, a wireless printer, and/or some other device capable of transmitting and receiving wireless signals over a wireless network. The peer device 130 includes a WNIC. Two or more peer devices (e.g., the camera 100 and the peer device 130) may communicate directly over a WLAN without an intermediate AP. A Wi-Fi WLAN over which peer devices communicate directly is known as an "ad hoc mode" network.

Example Camera Architecture

Figure 2:
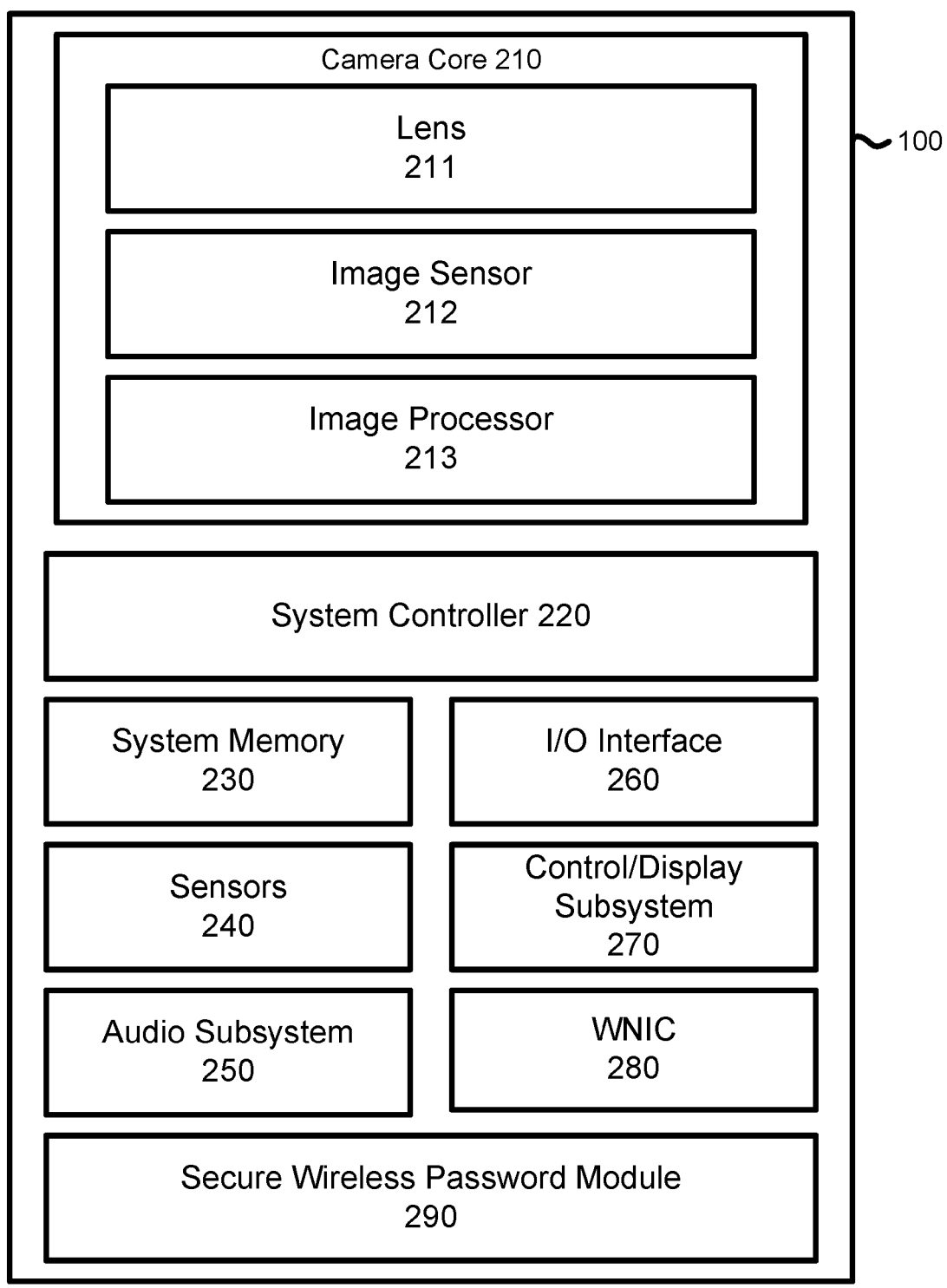
FIG. 2 illustrates a block diagram of an example camera architecture.

FIG. 2 illustrates a block diagram of the architecture of an example camera 100. The camera 100 includes a camera core 210, a system controller 220, a system memory 230, sensors 240, an audio subsystem 250, an I/O interface 260, a control/display subsystem 270, a WNIC 280, and a secure wireless password module 290. The camera core 210 may include a lens 211, an image sensor 212, and an image processor 213.

As described in greater detail below, the camera 100 may include sensors 240 to capture metadata associated with video data, such as timing data, motion data, speed data, acceleration data, altitude data, GPS data, and the like. In a particular embodiment, location and/or time centric metadata (geographic location, time, speed, etc.) may be incorporated into a media file together with the captured content in order to track the location of the camera 100 over time. This metadata may be captured by the camera 100 itself or by another device (e.g., a mobile phone or device connected to the camera 100) proximate to the camera 100. In one embodiment, the metadata may be incorporated with the content stream by the camera 100 as the content is being captured. In another embodiment, a metadata file separate from the video file may be captured (by the same capture device or a different capture device) and the two separate files can be combined or otherwise processed together in post-processing.

In the embodiment illustrated in FIG. 2, the camera 100 comprises a camera core 210 comprising a lens 211, an image sensor 212, and an image processor 213. The camera 100 additionally includes a system controller 220 (e.g., a microcontroller or microprocessor) that controls the operation and functionality of the camera 100 and system memory 230 configured to store executable computer instructions that, when executed by the system controller 220 and/or the image processors 213, perform the camera functionalities described herein. In some embodiments, a camera 100 may include multiple camera cores 210 to capture fields of view in different directions which may then be stitched together to form a cohesive image. For example, in an embodiment of a spherical camera system, the camera 100 may include two camera cores 210 each having a hemispherical or hyper hemispherical lens that capture respective hemispherical or hyper-hemispherical fields of view which are stitched together in post-processing to form a spherical image.

The lens 211 may be, for example, a wide angle lens, hemispherical, or hyper hemispherical lens that focuses light entering the lens to the image sensor 212 which captures images and/or video frames. The image sensor 212 may capture high-definition images having a resolution of, for example, 720p, 1080p, 4k, or higher. For video, the image sensor 212 may capture video at frame rates of, for example, 30 frames per second, 60 frames per second, or higher. The image processor 213 performs one or more image processing functions of the captured images or video. For example, the image processor 213 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 230 and/or to a non-volatile storage, which may be in the form of internal storage or an external memory card.

An input/output (I/O) interface 260 transmits and receives data from various external devices. For example, the I/O interface 260 may facilitate the receiving or transmitting video or audio information through an I/O port. Examples of I/O ports or interfaces include USB ports, HDMI ports, Ethernet ports, audio ports, and the like. Furthermore, embodiments of the I/O interface 260 may include wireless ports that may accommodate wireless connections. Examples of wireless ports include Bluetooth, Wireless USB, Near Field Communication (NFC), and the like. The I/O interface 260 may also include an interface to synchronize the camera 100 with other cameras or with other external devices, such as a remote control, a second camera, a smartphone, a client device, or a video server.

A control/display subsystem 270 includes various control and display components associated with operation of the camera 100 including, for example, LED lights, a display, buttons, microphones, speakers, and the like. The audio subsystem 250 may include, for example, one or more microphones and one or more audio processors to capture and process audio data correlated with video capture. In one embodiment, the audio subsystem 250 includes a microphone array having two or more microphones arranged to obtain directional audio signals.

The sensors 240 may capture various metadata concurrently with, or separately from, video capture. For example, the sensors 240 may capture time-stamped location information based on a global positioning system (GPS) sensor, and/or an altimeter. Other sensors 240 may be used to detect and capture orientation of the camera 100 including, for example, an orientation sensor, an accelerometer, a gyroscope, or a magnetometer. Sensor data captured from the various sensors 240 may be processed to generate other types of metadata. For example, sensor data from the accelerometer may be used to generate motion metadata that includes velocity and/or acceleration vectors representative of motion of the camera 100. Sensor data from a GPS sensor can provide GPS coordinates identifying the location of the camera 100, and the altimeter can measure the altitude of the camera 100. In one embodiment, the sensors 240 are rigidly coupled to the camera 100 such that any motion, orientation, or change in location experienced by the camera 100 is also experienced by the sensors 240. The sensors 240 furthermore may associates a time stamp representing when the data was captured by each sensor. In one embodiment, the sensors 240 automatically begin collecting sensor metadata when the camera 100 begins recording a video.

The WNIC 280 is a wireless network interface controller. The WNIC 280 may include one or more radio frequency (RF) antennas for transmitting and receiving information over a wireless network. The WNIC 280 may also include a data processing subsystem comprising hardware and/or software for preparing data for transmission, decoding received data, and connecting to a WLAN. The data processing subsystem may implement encryption, decryption, error correction/detection, encoding/decoding, scrambling, de-scrambling, some other type of data processing, and/or some combination thereof. The WNIC 280 may support a specific protocol such as the Wi-Fi protocol. The WNIC 280 may connect to an AP in an infrastructure mode network or a peer device in an ad hoc mode network. The WNIC 280 provides a means to authenticate itself to a WLAN, which may include providing network credentials, such as a password, passphrase, or a security key. In some wireless security protocols, the WNIC 280 authenticates itself to a network using network credentials without directly transmitting said network credentials over the network.

The secure wireless password module 290 securely stores encrypted passwords or alternate network credentials in a non-volatile memory of the camera 100. The secure wireless password module 290 may be a digital hardware module, a software module implemented by one or more processors, or some combination thereof. The secure wireless password module 290 may include a non-volatile memory or may utilize part of the system memory 230. The secure wireless password module 290 receives network credentials for a WLAN (e.g., a password for a Wi-Fi network) and an identifier for the WLAN (e.g., an SSID). The secure wireless password module 290 may generate an encryption key based on the SSID. The secure wireless password module 290 may generate the encryption key by implementing any function that deterministically maps an SSID to an output suitable for use as an encryption key. The encryption key may be the SSID itself or a hash of the SSID. The secure wireless password module 290 encrypts the password using the generated encryption key. In some embodiments, encryption is performed according to a symmetric encryption algorithm, such as the Advanced Encryption Standard (AES) or similar encryption algorithm. The encrypted password may be stored in a non-volatile memory of the camera 100. The secure wireless password module 290 also stores a hash of the SSID, generated via a one-way hashing function, so that the hash of the SSID is associated in memory with (e.g., indexed to) the encrypted password.

The secure wireless password module 290 may also receive an SSID and determine whether an encrypted password is stored for the corresponding SSID. The secure wireless password module 290 hashes the SSID using the one-way hashing function. If the generated hash matches a hash stored by the secure wireless password module 290, the secure wireless password module 290 may generate an encryption key based on the SSID and decrypt the password associated with the matching hash. This password may then be used by the WNIC 280 to connect the network associated with the SSID. Thus, the secure wireless password module 290 allows the camera 100 to connect to a WLAN without requiring the WLAN's password to be input every time and without storing either the unencrypted password or the encryption key of the encrypted password on the camera 100. The secure wireless password module 290 therefore obviates the inconvenience for the user of continually entering a WLAN password and prevents a malicious actor who gains access to the camera 100 from obtaining the WLAN password.

Secure Wireless Password Module

Figure 3:
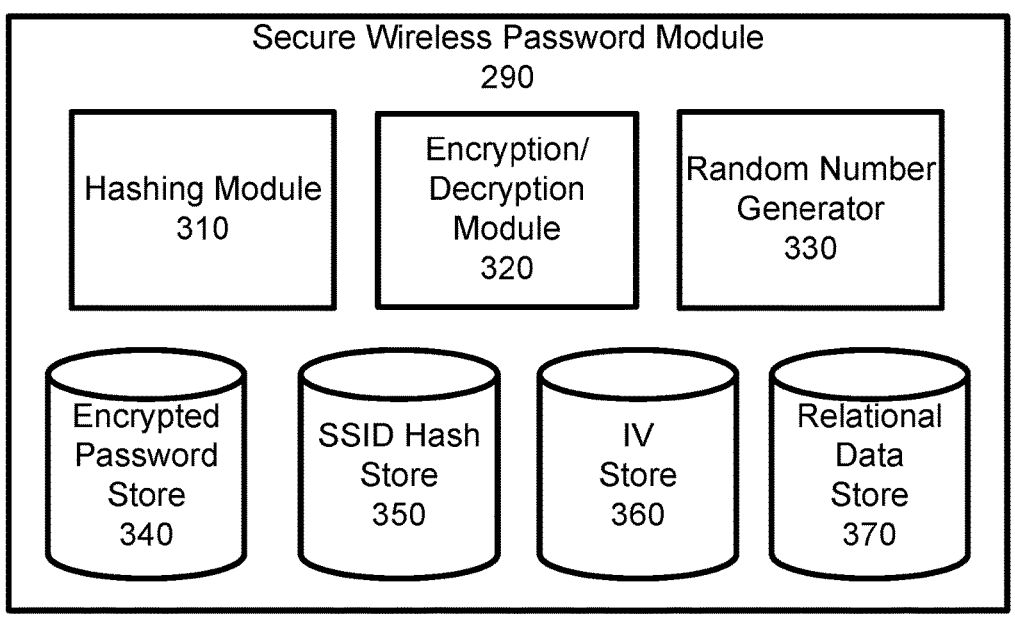
FIG. 3 illustrates a block diagram of a secure wireless password module.

FIG. 3 illustrates a block diagram of a secure wireless password module 290. The secure wireless password module 290 may be part of the camera 100, or part of another device which includes a WNIC. The secure wireless password module 290 includes a hashing module 310, an encryption/decryption module 320, a random number generator 330, an encrypted password store 340, an SSID hash store 350, an IV store 360, and a relational data store 370.

The hashing module 310 maps one or more inputs to an output using a one-way, cryptographically secure hashing function. The output of the hashing module 310 is referred to as a hash and may be a string of bits or characters. In some embodiments, the bit-length of the hash is fixed, while the length of the input is variable. In alternate embodiments, the hash is of variable length. The hashing functions implemented by the hash module 310 may take a single input or multiple inputs. In some embodiments, a hash function takes in two inputs: a value and a salt. The hash module 310 may employ a single hash function or multiple hash functions. In some embodiments, the hash module 310 is capable of performing multiple hashing functions which vary in complexity. In some embodiments, the hash is generated by a function other that a cryptographic hashing function. In an embodiment, the hashing module 310 may be implemented as computer-executable instructions stored to a non-transitory storage medium that are executed by one or more processors, a digital hardware module, or some combination thereof to carry out the functions attributed to the hashing module 310 described herein.

Because a secure one-way hashing function is, by design, a relatively slow algorithm, a hardware implementation of the hashing module 310 may be advantageous in some embodiments. A hashing module 310 may be a hardware module with a pipelined architecture so that multiple hashes may be computed in quick succession.

The encryption/decryption module 320 encrypts or decrypts data using encryption keys. The encryption/decryption module 320 may be implemented as computer-executable instructions stored to a non-transitory storage medium that are executed by one or more processors, a digital hardware module, or some combination thereof to carry out the functions attributed to the encryption/decryption module 320 described herein. The encryption/decryption module 320 may encrypt data using a symmetric encryption scheme or an asymmetric scheme. The encryption/decryption module 320 may implement symmetric schemes such as Twofish, Serpent, AES, Blowfish, CASTS, RC4, 3DES, Skipjack, Safer+/++, and IDEA, some combination thereof, and the like. The asymmetric encryption scheme may comprise RSA, Diffie-Hellman, Digital Signature Standard (DSS), ElGamal, any elliptic curve techniques, Paillier, Cramer-Shoup, YAK, some combination thereof, and the like. Encryption and decryption may utilize randomly generated initialization vectors (IVs). The encryption/decryption module 320 may also generate an encryption key from one or more encryption key seeds using a predefined deterministic function. The encryption key seed may be an SSID or string derived from the SSID (e.g., a hash of the SSID). The encryption key seeds may also include a randomly generated IV.

The random number generator 330 generates numbers, strings of bits, and encryption keys random or pseudo-random processes. The encryption/decryption module 320 may be implemented as computer-executable instructions stored to a non-transitory storage medium that are executed by one or more processors, a digital hardware module, or some combination thereof to carry out the functions attributed to the random number generator 330 described herein. In one embodiment, a seed of a cryptographically secure pseudo-random number generator is generated using a hardware random number generator, and the pseudo-random number generator is used to produce pseudo-random numbers. The random number generator 330 may produce elements such as random numbers, salts, symmetric encryption keys, initialization vectors, and private-public key pairs. The random number generator 330 may include multiple random number generators.

The encrypted password store 340, the SSID hash store 350, the IV store 360, and the relational data store 370 are non-volatile memories which store encrypted WLAN passwords, hashes of SSIDs, IVs, and associations between the hashes of SSIDs and the encrypted WLAN passwords respectively. The encrypted password store 340, the SSID hash store 350, the IV store 360, and the relational data store 370 may be part of larger memory, such as system memory 230. Alternately, each of these memories may comprise a dedicated separate physical memory. In still another embodiment, these memories comprise a combined dedicated hardware memory. The SSID hash store 350 stores hashes of SSIDs generated by the hashing module 310. The encrypted password store 340 stores encrypted WLAN passwords which may be generated by the encryption/decryption module 320. The IV store 360 stores initialization vectors (IVs), which are random or pseudo-random numbers or strings of bits. The IVs may be generated by the random number generator 330. The relational data store 370 stores the mapping of each hashed SSID memory location in the SSID hash store 350 to the memory location of the corresponding encrypted password in the encrypted password store 340. The encrypted password store 340, the SSID hash store 350, the IV store 360, and the relational data store 370 may be inaccessible to the user via a conventional user interface of the camera 100. In some embodiments, software on the camera 100 such as an operating system or firmware may prevent the user from directly reading or writing to these secure data stores 340, 350, 360, 370. In some embodiments, these secure data stores 340, 350, 360, 370 lack hardware connections which allow the rest of system memory 230 to read or written to by the standard instructions implemented on the processor of the camera 100. The memories may only include hardware connections accessible to the secure wireless password module 290.

Each hash of an SSID is mapped to an encrypted WLAN password by the relational data store 370. Each pair of encrypted WLAN password and hashed SSID may also be mapped to an IV in the relational data store 370. Each hashed SSID maps to the encrypted password which corresponds to the same WLAN (i.e., the WLAN having the SSID and password from which the hashed SSID and encrypted password are generated). An encrypted WLAN password maps to the IV (or vice versa) used to generate the encrypted password from the WLAN password. The mappings may be based on explicit stored references (e.g., in a table) which may be based on a mapping of the memory locations in the SSID hash store 340 to memory locations in the encrypted password store 340. In an alternate embodiment, the relational data store 370 is omitted and the mapping of hashed SSIDs to encrypted passwords and IVs is based on the position of the hashes, encrypted passwords, and IVs in memory. In still another embodiment, the SSID hash store 350 stores a reference to a memory location in the encrypted password store 340 and the IV store 360 in conjunction with each hashed SSID. In some embodiments, an equal number of encrypted passwords, hashed SSIDs, and IVs are stored. In an alternate embodiment, there are an equal number of encrypted passwords and hashed SSIDs, but fewer IVs. Thus, multiple encrypted passwords map to the same IV.

In some embodiments, the encrypted password store 340 and the SSID hash store 350 store fake pairs of encrypted passwords and hashed SSIDs. A fake encrypted password and hashed SSID do not correspond to an actual WLAN, but rather serve as a decoy. An attacker who gains access to the camera 100 will not be able to easily distinguish between real encrypted passwords and fake ones, which will make recovering the real passwords from the list of encrypted passwords more difficult. In some embodiments, the fake encrypted passwords are generated by the random number generator 330. In alternate embodiments, fake passwords are generated randomly and then encrypted using a random encryption key to generate the fake encrypted passwords. The fake passwords may be selected from a list of common passwords or generated probabilistically based on common password archetypes. In embodiments in which the fake encrypted passwords are generated from fake passwords, an attacker who manages to decrypt an encrypted password will not, in general, be able to determine if the password corresponds to a real password or a fake password.

The fake hashed SSIDs may be generated from fake SSIDs using the same one-way hashing function used to generate the real hashed SSIDs. The fake SSIDs may be randomly generated by the random number generator 330. In some embodiments, the fake SSIDs are generated or selected to include one or more bytes that do not correspond to a human-readable character (e.g., a byte that does not represent a character in the ASCII or UTF-8 encoding schemes). In these embodiments, it will be unlikely that a fake SSID matches an actual SSID because SSIDs usually consist only of human readable characters terminated by a null character. In some embodiments, a set of fake encrypted passwords and fake hashed SSIDs are generated once and stored along with the real encrypted passwords and real hashed SSIDs.

In some embodiments, a number of fake encrypted passwords and fake hashed SSIDs are stored to the encrypted password store 340 and the SSID hash store 350 whenever a pair of a real encrypted password and a hashed SSID are stored. For example, 10 to 100,000 fake encrypted passwords and fake hashed SSIDs may be stored for each real pair of encrypted password and hashed SSID.

Securely Storing Wireless Authentication Credentials

Figure 4:
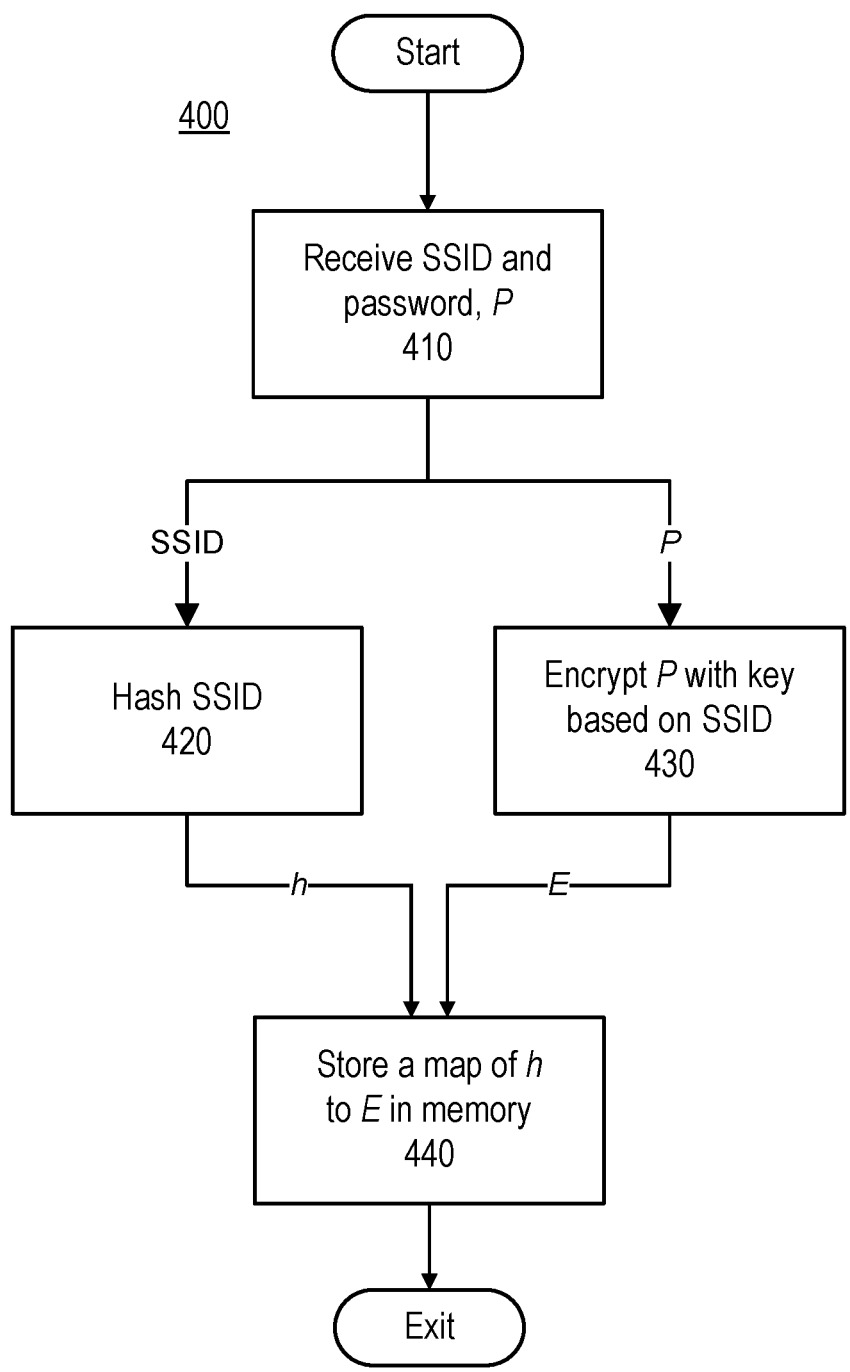
FIG. 4 illustrates a block diagram of a process for encrypting a password for a WLAN and storing it in conjunction with a hash of the WLAN's SSID.

FIG. 4 illustrates a block diagram of a process for encrypting a password for a WLAN and storing it in conjunction with a hash of the WLAN's SSID. The process 400 may be performed by the secure wireless password module 290. Other entities may perform some or all of the steps of the process 400 in other embodiments. Likewise, embodiments may include different and/or additional steps, or perform the steps in different orders. It is noted that the process 400 is not necessarily a thread of execution as defined by an operating system, although it may be.

The secure wireless password module 290 receives 410 an SSID for a WLAN and a corresponding password P. In embodiments in which the secure wireless password module 290 is on the camera 100, the SSID and the password P may be received from an external device, such as a peer device 130. The external device may connect to the camera 100 through an ad hoc mode WLAN or other wireless connection. In some embodiments, the external device connects to the camera 100 through a wired electronic connection. A software application on the external device or on the camera 100 may trigger the external device to transmit the SSIDs and passwords for one or more WLANs responsive to input from a user. The SSIDs and passwords transmitted to the camera 100 may be from the list of passwords and SSIDs stored on the external device that the external device uses when connecting to WLANs. In some embodiments, the SSID and the password P may be retrieved from a removable storage medium or an external memory on the camera 100, such as a secure digital (SD) card.

In some embodiments, the camera 100 detects the SSID of a WLAN through the WNIC 280. The camera 100 may prompt a user to enter a password through, for example, a touch screen or keyboard. The camera 100 may use the password P entered by the user to connect to the WLAN. If the WLAN rejects the authentication attempt using the password P, the camera 100 may indicate to the user that the password P is incorrect and request a new password. If the authentication attempt using the password P is successful, the SSID and password pair may be considered correct and securely stored as detailed below.

After receiving 410 the password P and the SSID, the secure wireless password module 290 hashes 420 the SSID. Hashing 420 the SSID may comprise applying a one-way hashing function to the SSID with the hashing module 310. Hashing 420 the SSID generates a hash h which may be stored in an SSID hash store 350. The one-way hashing function may incorporate a salt. The salt may be a random number stored on the camera 100. In some embodiments, the salt is generated based on a unique device ID of the camera 100.

In some embodiments, different hashing functions are used depending on features of the WLAN, such as a security level associated with the WLAN. For example, a hashing function of relatively low complexity may be used for SSID corresponding to a WLAN that is an ad hoc network, and a hashing function of relatively high complexity may be used for an infrastructure mode WLAN. In some embodiments, the hashing module 310 uses a more complex hashing function for WLANs which employ more secure authentication schemes. For example, the SSID of a WLAN secured with WEP may be hashed with a simpler algorithm than the SSID of a WLAN secured with WPA2.

In some embodiments, the SSID is combined with other information about a WLAN or an AP of the WLAN prior to hashing. This information may, for example, be received by the camera 100 from a beacon frame transmitted by an AP. The beacon frame is a frame transmitted periodically by an AP. A beacon frame includes the SSID, the Media Access Control (MAC) address of the AP, a two byte capability information field, a supported rates field, as well as additional information about the AP and/or the WLAN. The hash h may be generated from the combination of the SSID and the MAC address, a portion of the capability information, the list of rates supported by the WLAN, the security scheme of the WLAN (e.g., WEP, WPA, WPA2, etc.), other information from the beacon frame, or some combination thereof. The hash h may also be generated from a GPS location as detected by a GPS receiver on the camera 100.

Generating the hash h from an SSID and additional information instead of an SSID alone will make the task of discovering the SSID from the hash h (e.g., via a dictionary attack) much more difficult for a malicious actor. However, the secure wireless password module 290 will only be able to decode the password P when it detects the AP corresponding to the additional information, which may be undesirable when a WLAN includes multiple APs. The secure wireless password module 290 may store a hash, a password, or both for each AP of the WLAN, or a subset of the APs of the WLAN. In some embodiments, the type of information used to create h is responsive to features of the WLAN. For example, the hash may be generated from a combination of the SSID and a MAC address when a WLAN includes exactly one AP and be generated from just the SSID when a WLAN includes more than one AP. A hash generated from less information (e.g., a hash generated only from the SSID) may be hashed with a more complex algorithm (e.g., a hashing algorithm that requires more computation time) than a hash generated with more information. Similarly, the encryption key used to encrypt the password P may also be based on a combination of the SSID and additional information retrieved from the beacon frame of a WLAN.

After receiving 410 the password P and the SSID, the secure wireless password module 290 also encrypts 430 the password P with an encryption key K generated from the SSID. The encryption key K may be generated from a combination of the SSID and additional information about the WLAN such as the MAC address of one or more of the APs, the security scheme of the network, and the like. An IV, generated by the random number generator 330, may also be used to generate the encryption key K. In some embodiments, the encryption key K is generated by hashing the SSID with a one-way cryptographic hashing function. In such an embodiment, an attacker who manages to decrypt the password P by a brute force decryption attack will not be able to easily discover the SSID to which the password P corresponds. Generating the encryption key K and using it to encrypt 430 the password P may be performed by the encryption/decryption module 320. Encrypting 430 the password P may comprise implementing a symmetric key encryption algorithm. Encrypting 430 the password P produces an encrypted password E which is stored in the encrypted password store 340. The encryption key K may be deleted from memory after the encrypted password E is generated.

In some embodiments, the encrypted password E includes the encrypted password and additional information or settings for the communication of the camera 100 over the WLAN. The encrypted password E may include a network discovery setting, which configures whether other devices connected to the WLAN may detect the camera 100 and configures whether other devices connect to the WLAN may be detected by the camera 100. The encrypted password E may also include an automatic connect setting, which configures whether the camera 100 automatically connects to the WLAN upon discovering it. In addition, the encrypted password E may include a sync setting which configures whether the camera 100 automatically uploads selected data, such as videos or digital images, upon connection to the network. The camera 100 may upload selected data to, for example, an Internet connected server or a hard drive or solid state drive connected to the WLAN. The encrypted password E may include user credentials which are used to authenticate the connection of the camera 100 to the device or service to which the camera 100 uploads data. The additional information or settings included in the encrypted password E may be encrypted with the encryption K or stored in plaintext. In some embodiments, the encrypted password E includes an encryption key which is used to decrypt encrypted data stored elsewhere on the camera 100, such as user credentials, settings, and/or additional information.

After the SSID is hashed 420 and the password P is encrypted 430, a map of the hash h to the encrypted password E is stored 440 in memory. The hash h is stored in the SSID hash store 350 and the encrypted password E is stored in the encrypted password store 340. The hash h is mapped to the encrypted password E using any suitable data structures, such as arrays, hash maps, linked lists, and the like. In some embodiments, the set of all hashed SSIDs are stored in an ordered list. In embodiments in which a randomly generated IV is used to encrypt the password P, the IV may be stored in the IV store 360. If the IV has already been stored in association with another pair of an encrypted password and a hashed SSID, a reference to the location of the IV memory may be stored in association with the hash h and the encrypted password E. The operations of hashing 420 the SSID and encrypting 430 the password P may be performed in either order or simultaneously. Similarly, the encrypted password E, the hash h, and the IV may be stored in either order or simultaneously. After the hash h and the encrypted password E are stored, the SSID and password P may be deleted from memory.

In some embodiments, the above process 400 is performed with additional cryptographic obfuscation on the password P or on the SSID, which depends on external authentication credentials not stored in a non-volatile memory the camera 100. The external authentication credentials may be a PIN password, passphrase, or password input by the user into the camera 100, or may be provided by a hardware security token. The external authentication credentials may be a second encryption key $K_2$ or be used to generate the second encryption key $K_2$. The second encryption key $K_2$ may be used to encrypt the hash h or the IV, or to provide an additional layer of encryption to the encrypted password E. The external authentication credentials may also be used as a salt when generating the hash h or when encrypting the password P.

In some embodiments, an external encryption setting S configures whether or not the password P is encrypted using external authentication credentials. The external encryption setting S may be a Boolean value such that the password P is doubly encrypted using the external encryption credentials and the SSID (i.e., encrypted with the first encryption key K and second encryption key $K_2$) if the external encryption setting S=1. The password P may be encrypted without the external authentication credentials (i.e., encrypted with the encryption key K only) if the external encryption setting S=0. The external encryption setting S may be chosen by a user interaction with the camera 100, be included with the password P and the SSID received from an external device, and/or be automatically determined based on the features (e.g., the security settings) of the WLAN. If the external encryption setting S=0, the encrypted password E is generated by encrypting the combination of the external encryption setting S and the password P with the encryption key K based on the SSD. If the encryption setting S=1, the password P is first encrypted with a second encryption key, $K_2$, based on the external authentication credentials to generate an encrypted password P'. The encrypted password E is then generated by encrypting the combination of the external encryption setting S and the encrypted password P' with the encryption K generated from the SSID.

In some embodiments, a third encryption key $K_3$ is used to encrypt the password P and the SSID to generate an encrypted output R. The encrypted output R may be stored in addition to the hash h and the encrypted password E. The third encryption key $K_3$ may be the public key corresponding to a private key $K_3'$. The private key $K_3'$ may be generated from external authentication credentials which may be the same as those used to generate the second encryption key $K_2$ or different. The public key $K_3$ may be stored in plaintext on the camera 100 while the private key $K_3'$ is not stored in the non-volatile memory of the camera 100 in any form. Consequently, the encrypted output R can be generated without requiring the external user credentials, but the encrypted output R cannot be decoded without them. Storing the encrypted output R on the camera 100 may allow a user who provides the private key $K_3'$ to view a list of the SSIDs and the corresponding passwords stored on the device. In some embodiments, the public key $K_3$ is a symmetric key, and must be provided by the user whenever a pair of an SSID and a password is added to the secure wireless password module 290.

Decrypting Authentication Credentials for a Wireless Network

FIG. 5 illustrates a block diagram of a process for decrypting a password for a WLAN based on the WLAN's SSID. The process may be performed by the secure wireless password module 290. Other entities may perform some or all of the steps of the process 500 in other embodiments. Likewise, embodiments may include different and/or additional steps, or perform the steps in different orders. It is noted that the process 500 is not necessarily a thread of execution as defined by an operating system, although it may be.

The secure WNIC 280 detects 510 an SSID of a WLAN. In general, the WNIC 280 detects an SSID of a WLAN by receiving a beacon frame transmitted by a device (e.g., an AP) of the WLAN. In the Wi-Fi network protocols, a beacon frame is transmitted periodically with a certain frequency (e.g., every 100 ms). The WNIC 280 sends the SSID of the detected WLAN to the secure wireless password module 290. In some embodiments, the WNIC 280 sends the SSID to the secure wireless password module 290 responsive to an interaction from the user (e.g., a user presses a button or interacts with a user interface object on a touch screen), which may include selecting an SSID from a list of SSIDs. In an alternate embodiment, the WNIC 280 sends the SSID to the secure wireless password module 290 automatically after detecting it. In some embodiments, the WNIC 280 sends SSIDs to the secure wireless password module 290 in the order of the relative strengths of the WLANs' signals.

After receiving the SSID, the secure wireless password module 290 hashes 520 the SSID. The hashing 520 operation is functionally the same as the hashing operation performed in step 420 shown in FIG. 4. Hashing 520 the SSID produces a hash, $h_{SSID}$. The secure wireless password module 290 compares 530 the hash $h_{SSID}$ to the set of stored hashes, $\{h_1, \ldots, h_N\}$. The set of stored hashes $\{h_1, \ldots, h_N\}$ comprises the N unique hashed SSIDs, which are stored in the SSID hash store 350 and may have been generated by step 420 of process 400. Each hash in $\{h_1, \ldots, h_N\}$ is mapped in memory to an encrypted password of the set $\{E_1, \ldots, E_N\}$.

If no hashed SSID in the stored hashes $\{h_1, \ldots, h_N\}$ matches the hash $h_{SSID}$ for the detected SSID (i.e., $h_{SSID} \notin \{h_1, \ldots, h_N\}$), then the process 500 terminates because the lack of a matching hash demonstrates that the encrypted password store 340 does not have a password stored for the SSID used to generate the hash $h_{SSID}$. In some embodiments, once the hash $h_{SSID}$ is determined not to match a hash in the stored hashes another SSID in the list of SSIDs detected by the WNIC 280 is hashed until a matching SSID is found or until all SSIDs that have been detected by the WNIC 280 have been hashed and found not to be in the stored hashes $\{h_1, \ldots, h_N\}$. In some embodiments, if the hash for the detected SSID does not match any of the stored hashes $h_{SSID} \in \{h_1, \ldots, h_N\}$ then the camera 100 prompts the user to enter a password for the WLAN corresponding to the SSID.

On the other hand, if the hash for the detected SSID $h_{SSID}$ matches a hash $h_i$ in the stored hashes $\{h_1, \ldots, h_N\}$ (i.e., $h_{SSID}=h_i$ and $h_i \in \{h_1, \ldots, h_N\}$), the secure wireless password module 290 accesses the encrypted password store 340 to access the encrypted password $E_i$ mapped to by the hash $h_i$. The encryption/decryption module 320 generates an encryption key based on the SSID and decrypts 540 the encrypted password $E_i$ with the encryption key to recover the password P. The function used to generate the encryption key is the same function used in step 430 shown in FIG. 4. The decryption algorithm used to decrypt 540 the encrypted password $E_i$ is the inverse operation of the operation used to encrypt passwords in step 430. By decrypting the encrypted password $E_i$, the secure wireless password module 290 obtains the password $P_i$ for the WLAN corresponding to the SSID. In embodiments in which the encrypted password $E_i$ includes additional information and configuration settings, decrypting 540 the encrypted password $E_i$ will return said information and configuration settings as well.

Decrypting 540 the encrypted password $E_i$ or hashing 520 the SSID may require external authentication credentials in embodiments in which the process 400 of securely storing WLAN passwords is performed with additional cryptographic obfuscation on the password $P_i$ or on the SSID using external authentication credentials not stored in a non-volatile memory of the camera 100. The external authentication credentials may be a PIN, passphrase, or password input by the user into the camera 100, or may be provided by a hardware security token. The external authentication credentials may also be transmitted over a WLAN from a peer device (e.g., peer device 130). The external authentication credentials may be an encryption key or be used to generate an encryption key. This encryption key may be used to decrypt the hash h, the encrypted password $E_i$, and/or an IV associated with the encrypted password $E_i$. The external authentication credentials may also be used as a salt to generate the hash h or to decrypt the encrypted password $E_i$. In some embodiments, after the camera 100 has detected that a stored password exists for a SSID (i.e., by determining that $h_{SSID} \in \{h_1, \ldots, h_N\}$) the user is prompted to provide the external authentication credentials by, for example, inputting a personal identification number (PIN) or password or wirelessly connecting the camera 100 to a hardware security token (e.g., an RFID device). The provided external authentication credentials are used, along with the SSID and IV to decrypt the encrypted password $E_i$.

In some embodiments, the encrypted password $E_i$ is generated from source data including a password P and an external encryption setting S as described in the forgoing description. In such an embodiment, the encrypted password $E_i$ may be decrypted using the SSID to obtain the external encryption setting S and partially decrypted password $P_i'$. S=0 denotes that the partially decrypted password $P_i'$ is merely the plaintext password (i.e., $P_i'=P_i$). S=1 denotes that the partially decrypted password $P_i'$ is encrypted using external authentication credentials. If the external authentication credentials are not already stored in the volatile memory of the camera 100, the external authentication credentials may be obtained by prompting the user for them. The external authentication credentials may be used to decrypt the partially decrypted password $P_i'$ to obtain the password P.

After decoding the encrypted password E, to obtain the password $P_i$, the secure wireless password module 290 sends the password $P_i$ to the WNIC 280 which uses the password $P_i$ to access 550 the WLAN corresponding to the SSID. Accessing 550 the WLAN using the password $P_i$ comprises performing the authentication protocols of the security scheme implemented by the WLAN such as WEP, WPA, WPA2, and the like. In some embodiments, the WNIC 280 only connects to the WLAN if an auto connection setting is so configured. The auto connection setting may be recovered by decrypting the encrypted password $E_i$. In some embodiments, the encrypted password $E_i$ includes a network discovery setting, which configures whether other devices (e.g., peer device 130) connected to the WLAN may detect the camera 100 and configures whether other devices connect to the WLAN may be detected by the camera 100. In some embodiments, the encrypted password $E_i$ includes a sync setting which may trigger the camera 100 to automatically upload stored data, such as videos or pictures, to a remote device or service. The encrypted password $E_i$ may also include user credentials (e.g., a username and password for an online photograph or video storage service) which are used to authenticate the connection of the camera 100 to the device or service to which the camera 100 uploads data. In an alternate embodiment, the auto connection setting, the network discovery setting, and/or the sync setting are global settings stored on the camera 100.

Additional Considerations

The disclosed configuration describes a system and method for securely storing a Wi-Fi password or similar WLAN security credentials on a device, such as a camera. The password is secured by encryption using an encryption key based on the SSID of the WLAN and stored in the non-volatile memory of the device along with a one-way-hash of the SSID. The password may be recovered at a later time upon detection of the SSID of a WLAN. Without knowledge of the SSID, an attacker who gains access to the device will not be able to recover the password from the hashed SSID and the encrypted password.

Although the systems and methods for securely storing WLAN security credentials are described herein in the context of a camera 100, an alternate device with a WNIC could take the place of the camera 100. For example, some or all of the functions attributed to the camera 100 in this disclosure could be performed by a laptop computer, a desktop computer, a smartphone, a gaming console, a wireless hard drive, a media player, a printer, a television, a wireless booster, and the like.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed system and method for securely storing WLAN security credentials. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for encrypting and storing a wireless network password on a camera with a wireless network interface, the method comprising:
   receiving a plaintext SSID (Service Set Identifier) for a wireless network;
   receiving the wireless network password for the wireless network identified by the plaintext SSID;
   hashing the plaintext SSID with a one-way hashing function to generate a hashed SSID, the hashed SSID being different from the plaintext SSID;
   storing the hashed SSID in a non-volatile memory of the camera;
   generating an encryption key from the plaintext SSID;
   encrypting the wireless network password with the encryption key to generate an encrypted password; and
   storing the encrypted password in the memory of the camera, wherein the encrypted password is associated with the hashed SSID in the memory.

2. The method of claim 1, wherein the encrypting of the wireless network password with the encryption key to generate the encrypted password comprises using an initialization vector.

3. The method of claim 2, further comprising storing the initialization vector in the memory of the camera, wherein the initialization vector is associated with either the hashed SSID or the encrypted password in the memory.

4. The method of claim 1, wherein the hashing of the plaintext SSID with the one-way hashing function to generate the hashed SSID further comprises hashing a combination of the plaintext SSID and a salt with the one-way hashing function.

5. The method of claim 4, wherein the salt is based on a device ID unique to the camera.

6. The method of claim 1, wherein:
   the receiving of the plaintext SSID for the wireless network further comprises detecting a beacon frame transmitted by an access point associated with the wireless network, the beacon frame containing the plaintext SSID for the wireless network; and
   wherein the receiving of the wireless network password for the wireless network identified by the plaintext SSID further comprises receiving a user input of the wireless network password.

7. The method of claim 1, wherein the receiving of the plaintext SSID for the wireless network and the receiving of the wireless network password for the wireless network identified by the plaintext SSID further comprise receiving the plaintext SSID and the wireless network password from an external device communicatively coupled with the camera.

8. A non-transitory computer readable medium storing instructions for encrypting and storing a wireless network password on a camera with a wireless network interface, the instructions when executed by one or more processors causing the one or more processors to:
- receive an SSID (Service Set Identifier) for a wireless network;
- receive the wireless network password for the wireless network identified by the SSID;
- hash the SSID with a one-way hashing function to generate a hashed SSID;
- store the hashed SSID in a non-volatile memory of the camera;
- generate an encryption key from the SSID;
- encrypt the wireless network password with the encryption key to generate an encrypted password; and
- store the encrypted password in the memory of the camera, wherein the encrypted password is associated with the hashed SSID in the memory.

9. The non-transitory computer readable medium of claim 8, wherein the encrypting of the wireless network password with the encryption key to generate the encrypted password uses an initialization vector.

10. The non-transitory computer readable medium of claim 9, storing instructions that when executed further cause the one or more processors to store the initialization vector in the memory of the camera, wherein the initialization vector is associated with either the hashed SSID or the encrypted password in the memory.

11. The non-transitory computer readable medium of claim 8, wherein the hashing of the SSID with the one-way hashing function to generate the hashed SSID further comprises a hash of a combination of the SSID and a salt with the one-way hashing function.

12. The non-transitory computer readable medium of claim 11, wherein the salt is based on a device ID unique to the camera.

13. The non-transitory computer readable medium of claim 8, wherein:
- the receipt of the SSID for the wireless network further comprises detection of a beacon frame transmitted by an access point associated with the wireless network, the beacon frame containing the SSID for the wireless network; and
- wherein the receipt of the wireless network password for the wireless network identified by the SSID further comprises receipt of a user input of the wireless network password.

14. The non-transitory computer readable medium of claim of claim 8, wherein the receipt of the SSID for the wireless network and the receipt of the wireless network password for the wireless network identified by the SSID further comprise receipt of the SSID and the wireless network password from an external device communicatively coupled with the camera.

15. A camera, the camera comprising:
- a wireless network interface;
- a non-transitory computer readable medium storing computer executable instructions; and
- one or more hardware processors to execute the computer executable instructions to:
  - receive an SSID (Service Set Identifier) for a wireless network;
  - receive a wireless network password for the wireless network identified by the SSID;
  - hash the SSID with a one-way hashing function to generate a hashed SSID;
  - store the hashed SSID in a non-volatile memory of the camera;
  - generate an encryption key from the SSID;
  - encrypt the wireless network password with the encryption key to generate an encrypted password; and
  - store the encrypted password in the memory of the camera, wherein the encrypted password is associated with the hashed SSID in the memory.

16. The camera of claim 15, wherein the encryption of the wireless network password with the encryption key to generate the encrypted password comprises use of an initialization vector.

17. The camera of claim 16, wherein the non-transitory computer readable medium stores instructions that when executed further cause the one or more processors to store the initialization vector in the memory of the camera, wherein the initialization vector is associated with either the hashed SSID or the encrypted password in the memory.

18. The camera of claim 15, wherein the hashing of the SSID with the one-way hashing function to generate the hashed SSID further comprises hashing of a combination of the SSID and a salt with the one-way hashing function.

19. The camera of claim 18, wherein the salt is based on a device ID unique to the camera.

20. The camera of claim 15, wherein:
- the receipt of the SSID for the wireless network further comprises detection of a beacon frame transmitted by an access point associated with the wireless network, the beacon frame containing the SSID for the wireless network; and
- wherein the receipt of the wireless network password for the wireless network identified by the SSID further comprises receipt of a user input of the wireless network password.

* * * * *